United States Patent
Sahin et al.

(10) Patent No.: US 11,349,763 B1
(45) Date of Patent: May 31, 2022

(54) AVOIDING FAILURES IN SENDING DATA TO THE CLOUD DUE TO PERFORMANCE GRADIENT

(71) Applicant: EMC Corporation, Hopkinton, MA (US)

(72) Inventors: Adnan Sahin, Needham Heights, MA (US); Arieh Don, Newton, MA (US); Ian Wigmore, Westborough, MA (US); Stephen Smaldone, Woodstock, CT (US)

(73) Assignee: Dell Products L.P., Hopkinton, MA (US)

( * ) Notice: Subject to any disclaimer, the term of this patent is extended or adjusted under 35 U.S.C. 154(b) by 890 days.

(21) Appl. No.: 15/071,311

(22) Filed: Mar. 16, 2016

(51) Int. Cl.
*H04L 47/125* (2022.01)
*H04L 67/1097* (2022.01)
*H04L 47/22* (2022.01)
*H04L 47/28* (2022.01)

(52) U.S. Cl.
CPC ............ *H04L 47/125* (2013.01); *H04L 47/22* (2013.01); *H04L 47/286* (2013.01); *H04L 67/1097* (2013.01)

(58) Field of Classification Search
CPC .... H04L 67/1097; H04L 47/22; H04L 47/286
USPC ......................................................... 709/219
See application file for complete search history.

(56) References Cited

U.S. PATENT DOCUMENTS

| | | | | |
|---|---|---|---|---|
| 6,230,200 B1* | 5/2001 | Forecast | ................... | G06F 9/50 709/219 |
| 6,343,324 B1* | 1/2002 | Hubis | ................... | G06F 3/0622 709/229 |
| 8,775,549 B1* | 7/2014 | Taylor | ................. | H04L 67/1097 707/609 |
| 8,996,610 B1* | 3/2015 | Sureshchandra | ....... | G06F 16/20 709/203 |
| 2003/0079018 A1* | 4/2003 | Lolayekar | ............... | G06F 13/10 709/226 |
| 2004/0030857 A1* | 2/2004 | Krakirian | .............. | G06F 3/0626 711/206 |
| 2006/0098572 A1* | 5/2006 | Zhang | ................. | H04L 41/5009 370/229 |
| 2013/0204843 A1* | 8/2013 | Boldo | ................. | G06F 11/1471 707/649 |
| 2015/0103668 A1* | 4/2015 | Tian | ........................ | H04L 49/90 370/236 |
| 2015/0312126 A1* | 10/2015 | Deshpande | ......... | H04L 43/0894 709/216 |

* cited by examiner

*Primary Examiner* — Vivek Srivastava
*Assistant Examiner* — Hien V Doan
(74) *Attorney, Agent, or Firm* — Anderson Gorecki LLP

(57) ABSTRACT

In a storage system in which a storage array accesses cloud storage via a cloud gateway, the cloud gateway provides signals to control data rate between the storage array and the cloud. The signals may include commands to reduce or stop all volume streams or a select subset of volume streams. Data rate may be controlled on the basis of available buffering capacity of the cloud gateway and available bandwidth between the cloud gateway and cloud storage. The signals may be SCSI VU commands, where the cloud gateway is a SCSI initiator and the storage array is a SCSI target.

18 Claims, 3 Drawing Sheets

AVOIDING FAILURES IN SENDING DATA TO THE CLOUD DUE TO PERFORMANCE GRADIENT

BACKGROUND

The subject matter of this disclosure is generally related to data storage systems that may be used to maintain large data sets and support multiple host applications and concurrent users. A data storage system may include multiple storage arrays, and each storage array may include multiple computing nodes. The computing nodes manage access to tangible data storage devices. Each storage array presents one or more logical volumes of storage to host applications running on a host device. The host applications may access the logical volumes by sending IOs to the storage arrays. The computing nodes maintain an abstraction layer between the logical volumes and the tangible data storage devices.

SUMMARY

All examples, aspects and features mentioned in this document can be combined in any technically possible way.

In accordance with an aspect an apparatus comprises: a storage array comprising a computing node comprising a processor and volatile memory, and a storage resource pool that represents tangible data storage devices of different performance classes, wherein one of the performance classes comprises cloud storage, and wherein the computing node presents a production volume to a host application, data of the production volume being backed by the storage resource pool; and a cloud gateway via which the storage array accesses the cloud storage, the cloud gateway comprising a processor, volatile memory, and a program that provides signals to the storage array to control data rate between the storage array and the cloud gateway associated with the storage resource pool, the storage array responding to the signals by adjusting the data rate. In some implementations the program controls the data rate between the storage array and the cloud gateway based on available bandwidth between the cloud gateway and the cloud storage. In some implementations the program controls the data rate between the storage array and the cloud gateway based on available buffering capacity of the cloud gateway. In some implementations the signals comprise a command to reduce the data rate of all data streams. In some implementations the signals comprise a command to extend timeouts of all data streams. In some implementations the signals comprise a command to stop sending data of all data streams. In some implementations the signals comprise a command to reduce the data rate of a subset of all data streams. In some implementations the signals comprise a command to stop sending data of a subset of all data streams. In some implementations the cloud gateway is a SCSI initiator and the storage array is a SCSI target. In some implementations the signals comprise SCSI VU commands.

In accordance with an aspect a method comprises: with a storage array comprising a computing node comprising a processor and volatile memory: maintaining a storage resource pool that represents tangible data storage devices of different performance classes, wherein one of the performance classes comprises cloud storage; and presenting a production volume to a host application, data of the production volume being backed by the storage resource pool; and with a cloud gateway comprising a processor, volatile memory and a feedback program, providing signals to the storage array to control data rate between the storage array and the cloud gateway associated with the storage resource pool; and the storage array responding to the signals by adjusting the data rate. In some implementations the method comprises controlling the data rate between the storage array and the cloud gateway based on available bandwidth between the cloud gateway and the cloud storage. In some implementations the method comprises controlling the data rate between the storage array and the cloud gateway based on available buffering capacity of the cloud gateway. In some implementations the method comprises providing signals comprising a command to reduce the data rate of all data streams. In some implementations the method comprises providing signals comprising a command to extend timeouts of all data streams. In some implementations the method comprises providing signals comprising a command to stop sending data of all data streams. In some implementations the method comprises providing signals comprising a command to reduce the data rate of a subset of all data streams. In some implementations the method comprises providing signals comprising a command to stop sending data of a subset of all data streams. In some implementations the method comprises configuring the cloud gateway as a SCSI initiator and the storage array as a SCSI target. In some implementations the method comprises generating the signals as SCSI VU commands.

DETAILED DESCRIPTION

Some aspects, features and implementations described herein may comprise computer devices, components and computer-implemented steps or processes. It should be apparent to those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of tangible processor devices. For ease of exposition, not every step, process or element is described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. A "host application" is a computer program that accesses a storage service from a storage system via a storage network. A "volume" is a logical unit of storage presented by a storage system for use by host applications. The storage system manages the underlying tangible storage devices used to implement the storage services for the volume. A "data device" is a logical unit of storage that may be used within a storage array to manage access to tangible storage devices that are used to deliver storage services. A "storage resource pool" is a collection of data devices.

Figure 1:
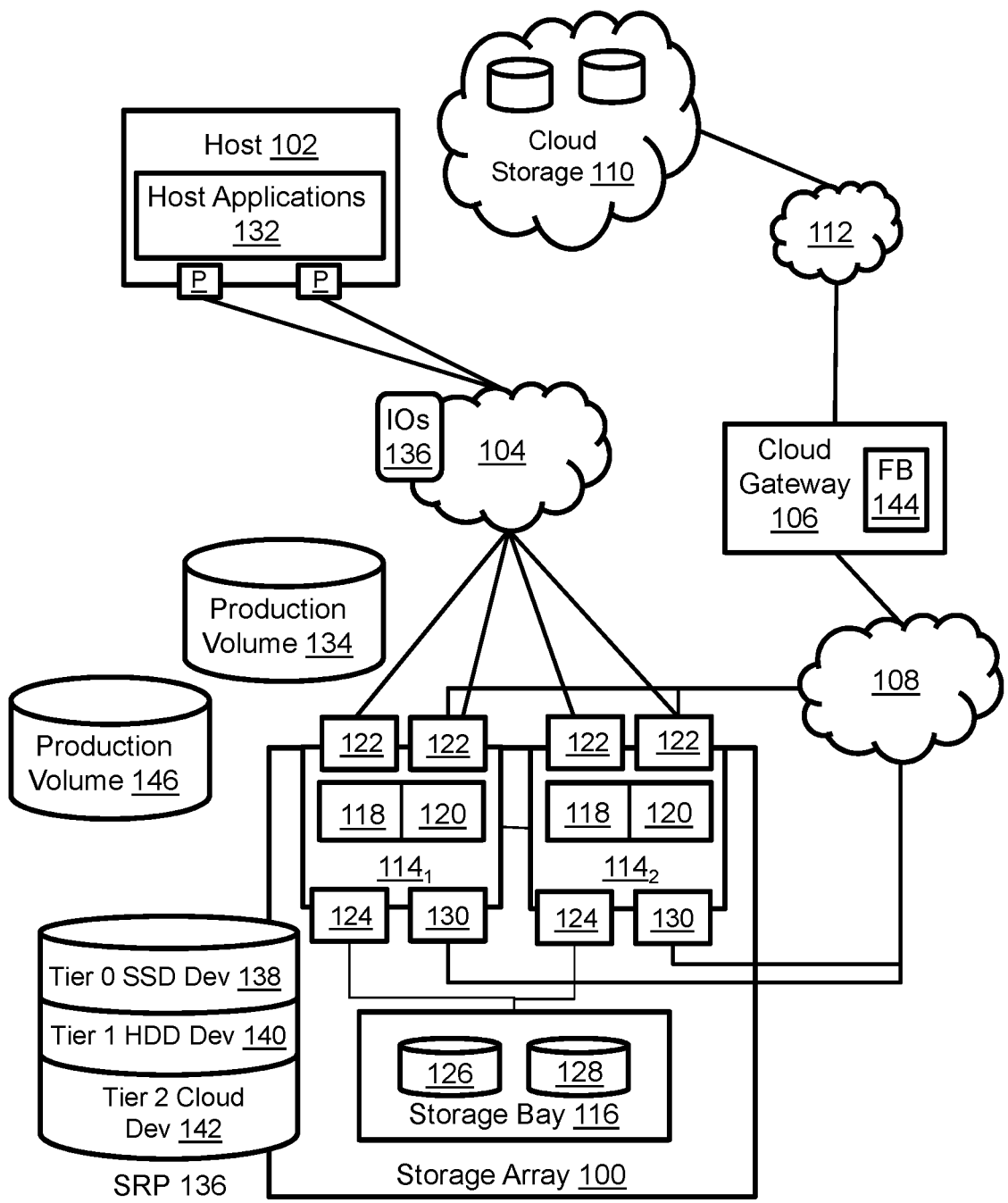
FIG. 1 illustrates a storage array in a feedback loop with a cloud gateway.

FIG. 1 illustrates an exemplary data storage system with a data storage array 100, a host device 102, a cloud gateway 106 and cloud storage 110. Any number of host devices and storage arrays could be included in the data storage system. The host device 102 is connected to the storage array 100 via a network 104. The storage array 100 is connected to the cloud gateway 106 via a network 108. The cloud gateway 106 is connected to cloud storage 110 via a network 112. The networks 104, 108, 112 may include various network nodes, e.g. switches, routers, hubs, and other network devices. For context and without limitation the networks may include one or more of the Internet, a WAN (wide area network), MAN (metropolitan area network) and LAN (local area network).

The storage array 100 includes one or more interconnected computing nodes $114_1$-$114_2$ and a storage bay 116. The computing nodes may include "vanilla" storage servers and specialized hardware platforms including but not limited to storage directors and storage engines that are designed for use in storage arrays. Each computing node includes at least one multi-core processor 118 and volatile memory 120. The volatile memory may include, for example and without limitation, RAM (random access memory). Each computing node is connected to every other computing node in the storage array via point-to-point links of an interconnecting fabric. The computing nodes include FAs (front-end adapters) 122 for communicating with the host 102 and possibly for receiving communications from the cloud gateway 106. The computing nodes include DAs (disk adapters) 124 for communicating with the storage bay 116, and DXs (emulated disk adapters) 130 for communicating with the cloud gateway 106 via network 108, e.g., sending communications to the cloud gateway and possibly for receiving communications from the cloud gateway. The storage bay 116 may include sets of tangible data storage devices of various different technology types, e.g. and without limitation a set 126 of SSD (solid state device) "flash" drives and a set 128 of HDDs (hard disk drives) with SAS interface. The storage array may implement block-based storage protocols such as iSCSI and Fibre Channel, and file-based interfaces such as NFS and CIFS, for example and without limitation.

The host 102 may be a tangible server computer with memory, storage and processors, or a virtual host associated with a virtual machine or container running on a tangible server computer. Any number of hosts may access the storage array. The host 102 operates host applications 132 that utilize the storage services of the storage array 100. There may be any number of host applications running on the host. Examples of host applications include but are not limited to a database, file server and block server. Each host includes one or more ports P. The host ports are connected to the network 104, and each host port may be associated with a network path to a particular storage array port associated with an FA 122. Any number of ports may be included and the hosts do not necessarily have access to all of the front end ports and FAs. The host may implement block-based storage protocols such as iSCSI and Fibre Channel, and file-based interfaces such as NFS and CIFS, for example and without limitation.

Cloud storage 110 may include one or more remote data centers that are managed by a cloud storage service provider. The data centers may include relatively low performance data storage devices and associated storage servers that can be accessed via the Internet. For example, network 112 may include the Internet. The data centers may be located where building space, power and labor costs are relatively low. Consequently, cost per unit of storage capacity may be low. However, cloud storage does not provide performance that is equivalent to the performance of the storage array, e.g. in terms of response time for servicing IOs. Cloud storage may implement SOAP, REST and proprietary Web-based APIs that are specific to the cloud storage service provider, for example and without limitation.

The computing nodes $114_1$, $114_2$ maintain logical production volumes 134, 146 of storage that are presented to the host applications 132. Without limitation, the production volumes may be referred to as production LUNs or host LUNs, where LUN (logical unit number) is a number used to identify the logical volume in accordance with the SCSI (small computer system interface) protocol. The host applications request IOs (input and output operations) 136 with reference to the production volumes, e.g. the host applications read and write data from and to tracks on the production volumes. The production volumes are backed by SRPs (storage resource pools). For example, production volume 134 is backed by SRP 136. The SRP 136 includes multiple data devices 138, 140, 142. The data devices are associated with different classes of storage resources. More particularly, data device 138 represents an amount of tier 0 storage on some or all SSD resources of the set 126 of SSDs in the storage bay 116. Data device 140 represents an amount of tier 1 storage on some or all HDD resources of the set 128 of HDD drives in the storage bay. Data device 142 represents an amount of tier 2 class storage on cloud storage 110.

Each production volume (or storage group of multiple production volumes) may be associated with a SLO (service level objective) that indicates demands for quality of service measured by response time to IO access to that production volume. For example, the SLO for production volume 134 may indicate an IO response time of no greater than 5 ms in order to enable the host applications 132 to provide a target level of performance or user experience. Production volume 146 may have an SLO that indicates an IO response time of no greater than 10 ms. Failing to satisfy the SLO does not necessarily cause the host applications to become non-functional, but user experience may fall below expectations. In order to help achieve the SLO for volume 134 a storage tiering program may promote relatively active data to higher performance storage media, e.g. to tier 0 SSD resources of data device 138, and demote relatively inactive data to lower performance storage media, e.g. to tier 1 HDD resources of data device 140. Particularly inactive data may be demoted or archived to tier 2 cloud storage on data device 142. Promotion and demotion may occur periodically or continuously as data activity levels change.

The cloud gateway 106 may be a tangible server computer that translates between the protocols and APIs implemented by the storage array and the protocols and APIs implemented by cloud storage. The cloud gateway may also include tangible memory and storage components that are used to buffer data being written to cloud storage 110. Due to the performance gradient between the data storage resources of the storage bay 116 and cloud storage 110 there is a possibility that, in the absence of the cloud gateway 106, a computing node of the storage array would provide data to cloud storage at a rate greater than the cloud storage is capable of supporting. The cloud gateway reduces the likelihood of that possibility by buffering data from the storage array. However, the cloud gateway has limited buffering capacity and the cloud storage has limited data intake capability.

Figure 2:
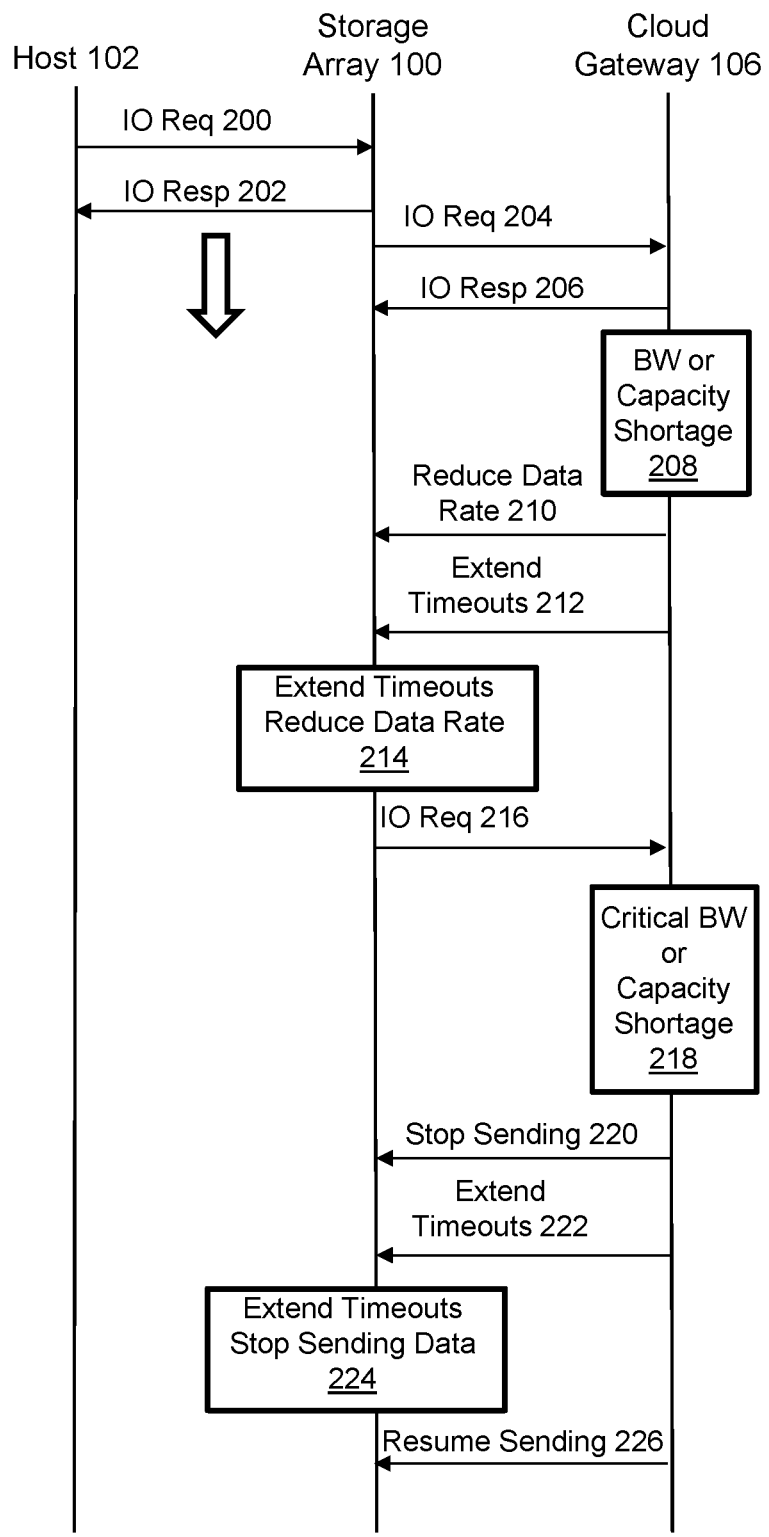
FIG. 2 illustrates operation of the feedback loop.

Referring now to FIGS. 1 and 2, the cloud gateway 106 includes a FB (feedback) program 144 that supports a feedback loop between the cloud gateway and the storage array 100 to enable data rate control. The host 102 and storage array 100 may exchange IO requests 200 and IO responses 202 on a continuous basis while data rate between the storage array and the cloud gateway is being adjusted. IO requests 204 and IO responses 206 between the storage array 100 and the cloud gateway 106 may occur as a result of the IO requests 200 and IO responses 202 between the host 102 and the storage array 100. For example, data may be demoted or archived from data device 138 or data device 140 to data device 142. Bandwidth and buffering capacity utilization between the storage array and the cloud storage may be a function of the IO requests 204 and IO responses 206 between the storage array 100 and the cloud gateway 106, along with other factors. The FB program 144 tracks available bandwidth and buffering capacity. Available bandwidth represents the amount of additional data traffic in terms of data rate that can be supported by cloud storage at a given point in time or period of time. For example, available bandwidth might be an indication of the difference between the maximum possible rate at which cloud storage can ingest data and the current rate at which cloud storage is ingesting data. Buffering capacity represents the available buffering capacity of the cloud gateway, e.g. the difference between the maximum potential capacity and the currently utilized capacity. Buffering may be on one or both of volatile and non-volatile memory and storage resources. Based on available bandwidth and buffering capacity the FB program determines when a shortage exists as indicated at 208. Available bandwidth and buffering capacity may be combined and compared with a shortage threshold to determine whether a shortage condition exists. For example, a shortage condition may exists when the data rate to cloud storage cannot be increased and the available buffering capacity of the cloud gateway becomes relatively small. Separate thresholds for available bandwidth and buffering capacity could be implemented. However, bandwidth and buffering capacity may be related, e.g. it may be possible to increase available bandwidth by utilizing more buffering capacity, or to increase buffering capacity by utilizing more available bandwidth, so a combined value and single shortage threshold may be implemented. In response to the detection of a shortage condition the FB program sends a feedback signal 210 to the storage array to prompt a reduction of the data rate of all streams. All signals from the cloud gateway may be sent to the storage array via FA 122 or DX 130, depending on implementation. The FB program may also send a signal 212 to prompt the storage array to extend the timeout settings for all streams being sent to the cloud gateway, i.e. all streams for which the data rate is being reduced. This mitigates the possibility of data device 142 being declared as failed within the storage array due to perceived non-responsiveness. In response to the signals from the cloud gateway the storage array extends the timeouts and sets a reduced data rate as indicated at 214. IO requests 216 for all streams are then sent at the reduced data rate.

The FB program may combine and compare available bandwidth and buffering capacity with a critical shortage threshold to determine whether a critical shortage condition exists as indicated in block 218. Again, however, separate thresholds could be implemented for available bandwidth and buffering capacity. A critical shortage condition may exist when the data rate to cloud storage cannot be increased and the available buffering capacity of the cloud gateway becomes critically small. Rate of change of increase or decrease with respect to the threshold might also be considered. In response to detection of a critical shortage condition the FB program sends a feedback signal 220 from the cloud gateway to the storage array to prompt the storage array to stop sending data to the cloud gateway for all volume streams. The FB program may also send a signal 222 to prompt the storage array to further extend the timeout settings for all volume streams being sent to the cloud gateway, i.e. for all volume streams for which data will stop being sent to the cloud gateway. In response to the signals from the cloud gateway the storage array extends the timeouts and stops sending data as indicated in block 224. The FB program may send a signal 226 to prompt the storage array to resume sending data when the critical shortage condition ceases, as detected by the FB program.

In one implementation the feedback signals sent by the FB program are provided via in-band signaling using SCSI commands. A cloud gateway normally serves only as a SCSI target so it is only capable of accepting and processing SCSI commands, e.g. from the DXs 130. In the illustrated example the cloud gateway is both a SCSI initiator and a SCSI target. Further, the storage array is both a SCSI initiator, e.g. via the DXs 130, and a SCSI target, e.g., via the FAs 122. Consequently, the cloud gateway can send vendor-specific SCSI VU control commands to the storage array. The feedback signals may be implemented as SCSI VU control commands. The feedback signals might be implemented via out-of-band communications over an Ethernet network, but possibly at lower out-of-band rates.

Figure 3:
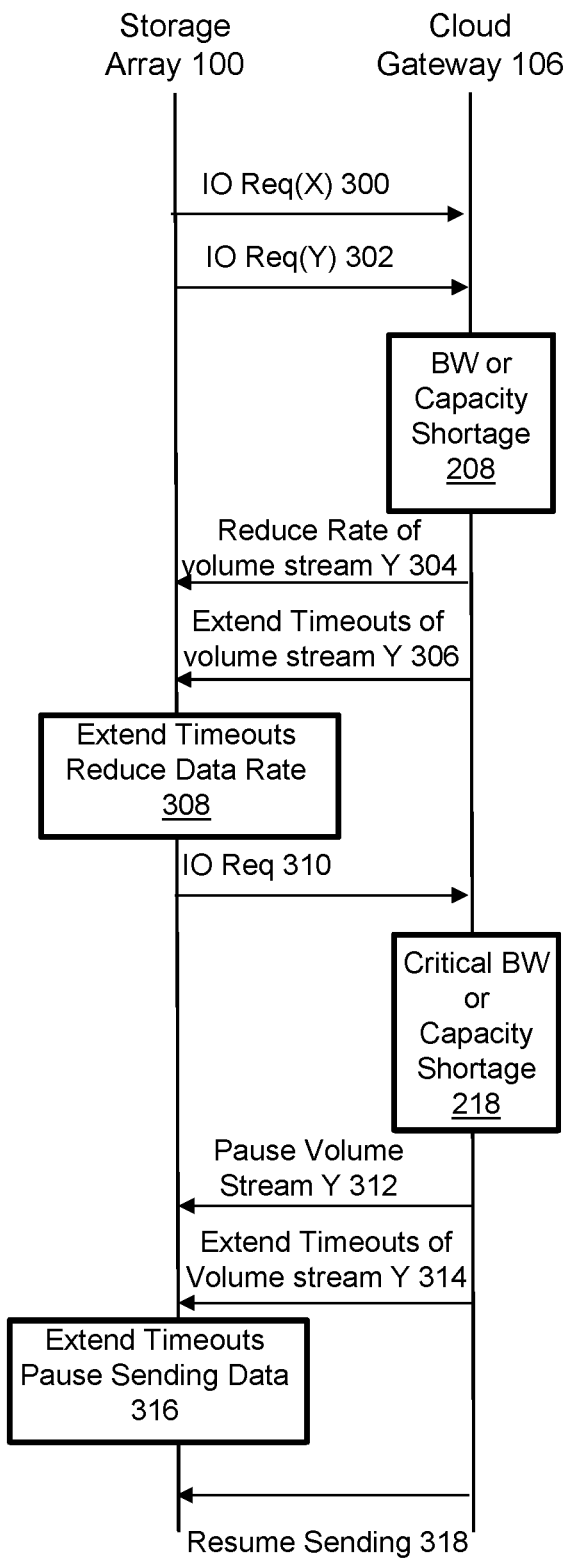
FIG. 3 illustrates control of individual volume streams.

Referring to FIGS. 1 and 3, feedback signals may be provided for specific volume streams, e.g. a select subset of the set of all volume streams. Not all data sent to cloud storage is necessarily of equal priority. For example, it may be desirable that some high priority volume data, e.g. for stream X associated with production volume 134, be moved to cloud storage within some time window while other lower priority volume data, e.g. for stream Y associated with production volume 146, may be able to be delayed without harm or inconvenience. The storage array may be notified by the cloud gateway via signaling to pause or slow the data rate of a select subset of the set of all volume streams for a time. In the illustrated example IO requests 300, 302 are associated with volume stream X from production volume 134 and volume stream Y from production volume 146, respectively, where stream X has a higher priority than stream Y. The 10 requests 300, 302 are sent to cloud gateway 106. The FB program in the cloud gateway detects a bandwidth or buffering capacity shortage as indicated in block 208. In response to detection of the shortage condition the FB program sends a feedback signal 304 to the storage array to prompt a reduction of the data rate of lower priority volume stream Y. The FB program may also send a signal 306 to prompt the storage array to extend the timeout settings for volume stream Y. In response to the signals from the cloud gateway the storage array extends the timeouts and sets a reduced data rate for volume stream Y as indicated at 308. IO requests 310 for volume stream Y are then sent at the reduced data rate while volume stream X is unaffected.

The FB program may determine that a critical shortage condition exists as indicated in block 218. In response to the critical shortage condition the FB program sends a feedback signal 312 from the cloud gateway to the storage array to prompt the storage array to pause (stop) sending volume stream Y data to the cloud gateway. The FB program may also send a signal 314 to prompt the storage array to further extend the timeout settings for volume stream Y. In response to the signals from the cloud gateway the storage array extends the timeout and stops sending volume stream Y data as indicated in block 316, while volume stream X is unaffected. The FB program may send a signal 318 to prompt the storage array to resume sending volume stream Y data when the critical shortage condition ceases. IO pausing may negate the need to restart the entire volume shipping to the cloud in case of BW issues.

It should be understood that the signals could be used in any of a wide variety of combinations. For example and without limitation, the data rate of a high priority volume stream could be reduced while a low priority volume stream is paused. Moreover, reduced data rates and amounts by which data rate is to be reduced could be quantified in the signals. Further, timeouts and extensions of timeouts could be quantified in the signals.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a storage array comprising a plurality of interconnected computing nodes, each comprising a processor and volatile memory, and a storage resource pool that represents tangible non-volatile data storage devices of different performance classes, one of the performance classes accepting local drives and another one of the performance classes accepting cloud storage that is remote from the storage array, and wherein the computing nodes present a logical production volume to a host application running on a host server for storage of host application data, the host application data of the logical production volume being backed by the storage resource pool, including the cloud storage; and
   a cloud gateway via which the storage array accesses the cloud storage, wherein the cloud gateway is a SCSI (small computer system interface) initiator and the storage array is a SCSI target for sending control commands, and wherein the cloud gateway is a SCSI target and the storage array is a SCSI initiator for sending SCSI data access commands that the cloud gateway translates into cloud storage protocol data access commands, the cloud gateway comprising a processor, volatile memory, and configured to provide the control commands from the cloud gateway to the storage array to cause a reduction of data rate from the storage array to the cloud gateway associated with data access to the storage resource pool, the storage array responding to the control commands by reducing data access commands sent from the storage array to the cloud gateway,
   whereby the storage array can use the cloud storage with the local drives as part of the storage resource pool.

2. The apparatus of claim 1 wherein the program controls the data rate between the storage array and the cloud gateway based on available bandwidth between the cloud gateway and the cloud storage.

3. The apparatus of claim 2 wherein the program controls the data rate between the storage array and the cloud gateway based on available buffering capacity of the cloud gateway.

4. The apparatus of claim 1 wherein the control commands comprise a command to reduce the data rate of all data streams.

5. The apparatus of claim 1 wherein the control commands comprise a command to extend timeouts of all data streams.

6. The apparatus of claim 1 wherein the control commands comprise a command to stop sending data of all data streams.

7. The apparatus of claim 1 wherein the control commands comprise a command to reduce the data rate of a subset of all data streams.

8. The apparatus of claim 1 wherein the control commands comprise a command to stop sending data of a subset of all data streams.

9. The apparatus of claim 1 wherein the control commands comprise SCSI VU (vendor-unique) commands.

10. A method comprising:
    with a storage array comprising a plurality of interconnected computing nodes, each comprising a processor and volatile memory:
      maintaining a storage resource pool that represents tangible non-volatile data storage devices of different performance classes, wherein one of the performance classes comprises local drives and another one of the performance classes comprises cloud storage that is remote from the storage array; and
      presenting a logical production volume to a host application running on a host server for storage of host application data, the host application data of the logical production volume being backed by the storage resource pool, including the cloud storage;
      configuring a cloud gateway as a SCSI (small computer system interface) initiator and the storage array as a SCSI target for sending control commands;
      configuring the cloud gateway is a SCSI target and the storage array as a SCSI initiator for sending data access commands; and
      sending SCSI data access commands to the cloud storage gateway; and
    with the cloud gateway, which comprises a processor, volatile memory, and a feedback program:
      translating the SCSI data access commands into cloud storage protocol data access commands; and
      providing control commands to the storage array to cause a reduction of data rate from the storage array to the cloud gateway associated with data access to the storage resource pool; and
    the storage array responding to the control commands by reducing data access commands sent from the storage array to the cloud gateway,
    whereby the storage array can use the cloud storage with the local drives as part of the storage resource pool.

11. The method of claim 10 comprising controlling the data rate between the storage array and the cloud gateway based on available bandwidth between the cloud gateway and the cloud storage.

12. The method of claim 11 comprising controlling the data rate between the storage array and the cloud gateway based on available buffering capacity of the cloud gateway.

13. The method of claim 10 comprising providing control commands comprising a command to reduce the data rate of all data streams.

14. The method of claim 10 comprising providing control commands comprising a command to extend timeouts of all data streams.

15. The method of claim 10 comprising providing control commands comprising a command to stop sending data of all data streams.

16. The method of claim 10 comprising providing control commands comprising a command to reduce the data rate of a subset of all data streams.

17. The method of claim 10 comprising providing control commands comprising a command to stop sending data of a subset of all data streams.

18. The method of claim 10 comprising generating the control commands as SCSI VU (vendor-unique) commands.

\* \* \* \* \*